(12) United States Patent
Mura

(10) Patent No.: US 7,179,318 B2
(45) Date of Patent: Feb. 20, 2007

(54) SLIDING MEMBER

(75) Inventor: Yoshihiro Mura, Tokyo (JP)

(73) Assignee: Eagle Industry Co., Ltd., Tokyo (JP)

( * ) Notice: Subject to any disclaimer, the term of this patent is extended or adjusted under 35 U.S.C. 154(b) by 25 days.

(21) Appl. No.: 11/108,782

(22) Filed: Apr. 19, 2005

(65) Prior Publication Data
US 2005/0236073 A1    Oct. 27, 2005

(30) Foreign Application Priority Data
Apr. 21, 2004   (JP)   ............... 2004-125352

(51) Int. Cl.
C22C 38/22     (2006.01)
(52) U.S. Cl. .......................... 75/231; 420/37
(58) Field of Classification Search .............. None
See application file for complete search history.

(56) References Cited

U.S. PATENT DOCUMENTS 5,332,422 A * 7/1994 Rao ........................ 75/252
5,484,662 A * 1/1996 Rao ........................ 428/553

FOREIGN PATENT DOCUMENTS

| EP | 453068 | * | 2/1991 | |
| JP | 359074265 | * | 4/1984 | ............... 75/240 |
| JP | 62-164858 | * | 7/1987 | |

* cited by examiner

*Primary Examiner*—George Wyszomierski
(74) *Attorney, Agent, or Firm*—Arent Fox PLLC

(57) ABSTRACT

The present invention aims at preventing abrasion of relatively sliding members under a high pressure or/and high temperature condition. It also aims at preventing seizure of the sliding contact surfaces at high temperatures. The sliding member of the present invention serves as one of a pair of relatively sliding members essentially consisting of stainless steel as base material containing 5% to 10% by weight of cobalt, 1 to 5% by weight of molybdenum disulfide and 2% to 5% by weight of calcium fluoride.

3 Claims, 6 Drawing Sheets

SLIDING MEMBER

BACKGROUND OF THE INVENTION

1. Field of the Invention

The present invention relates generally to a technical field of a sliding member which exhibits excellent abrasion resistance as well as outstanding oxidation and corrosion resistance. More particularly, the invention relates to a sliding member in which a specific mixture rate of powder material not only improves the abrasion resistance at a high temperature but also prevents abrasion of counterpart member thereof.

2. Description of the Related Art

Technologies related to the present invention can be applied to sliding members used in a variety of parts of automobile engines such as EGR valve for exhaust gas, butterfly valve in exhaust brake or turbo charger waste gate, bearings for other rotary portions, or sliding elements in high temperature gas turbine engines. This sliding member, in particular, is effective for the use to bearings in automobiles or the like. Road sometimes becomes full of exhaust gases and a sliding surface of bearing is brought into contact with such a fluid. The sliding member is subjected to heat generation due to relative sliding motion against a sliding counterpart, and the resulting temperature increase caused by the sliding motion accelerates the abrasion of sliding surface thereof and may cause a seizure at the sliding surface. Recently, manufactures of the sliding members are urged to take an appropriate action toward the above problem. For these reasons, a sliding element is required to possess strength at a high temperature and exhibit excellent abrasion resistance. Conventional sliding members, however, fail to meet these demands since they may be able to satisfy one of the demands while they fail to satisfy the other.

Therefore, there have been increasing demands towards such a material for sliding members that enjoys outstanding corrosion and oxidation resistance as well as high abrasion resistance under a high temperature atmosphere, and is able to prevent abrasion of relatively sliding counterpart. Also the material is expected to do no harm to environments, for example, by releasing additive components of sintered parts as wear particles during the relative sliding motion. Also it is important for the sliding members to be manufactured at a low cost as a sintered machine part.

For example, there is a bearing for high temperature use as a prior art which is a sintered bearing formed by press forming, being made of stainless steel powder which is blended with distributed dry lubricant material such as carbon powder, lead monoxide or the like. The carbon powder added, however, tends to form a solid solution in the base material, stainless steel, and thereby decreases heat and corrosion resistance possessed by the original stainless steel. Also expansion of the sintered bearing due to oxidation limits the maximum working temperature under a high temperature atmosphere to less than 500° C. Lead monoxide, on the other hand, is also limited in its applications due to its potential harm to the environment.

There is another prior art which is a nickel-based bearing alloy which is also formed by sintering after blending Co—Mo—Cr—Si hard particles into Ni powder base.

However, inclusion of hard particles in the Ni powder base does enhance abrasion resistance thereof because of the hard particles, but also increases friction coefficient thereof, thereby rapidly wearing away the sliding surface of a relatively sliding rotary shaft or the like.

The inventor then developed a sintered metal bearing which includes Co powder or powder alloy containing Co in stainless steel powder in order to circumvent the above defect wherein the powder mixture is press-formed at molding pressure of 5 ton/cm2 and sintered at sintering temperature of 1150° C. for 60 minutes under a mixed atmosphere of nitrogen gas and hydrogen gas. Even this sintered metal is not free from troubles under certain conditions such as low critical seizure load under relative sliding motion in a high temperature atmosphere. When a counterpart, e.g., a relatively sliding rotary shaft, is made of free-cutting steel or the like, the hard powders contained in the bearing will wear down the counterpart.

Further, a sintered bearing containing austenitic stainless steel suffers from poor corrosion resistance compared with a bearing which is made of ingot material, due to porous structure thereof which is a characteristic nature in sintered metals. This observation can easily be verified by rapid rust formation under a salt spray test. Inconel alloy with high Ni inclusion is outstanding in this respect, but cannot be a favorable choice for bearing due to high cost thereof.

The present invention is introduced to resolve the above mentioned problems. A primary technical goal which this invention tries to achieve is to provide a sliding member which enjoys oxidation and corrosion resistance and prevents seizure on the sliding surface thereof during relative sliding motion over a wide temperature range from a low temperature to a high temperature such as 700° C. Another goal is to prevent the sliding member from causing abrasion of a relatively sliding counterpart regardless of the working temperature, high or low.

BRIEF SUMMARY OF THE INVENTION

A primary object of the present invention is to resolve the above mentioned technical problems, and a solution to such problems is embodied as follows.

A sliding member of the present invention serves as one of a pair of relatively sliding members essentially consisting of stainless steel as base material containing 5% to 10% by weight of cobalt, 1 to 5% by weight of molybdenum disulfide and 2% to 5% by weight of calcium fluoride.

According to the sliding member related to the present invention, it is a sintered metal which consists of stainless steel as base material containing 5% to 10% by weight of cobalt (Co) powder, 1 to 5% by weight of molybdenum disulfide powder (MoS2) and 2% to 5% by weight of calcium fluoride (CaF2) powder. On the other hand, it has been found that another case of sintered stainless steel containing 5% to 10% by weight of cobalt powder for the purpose of improved corrosion resistance failed to bring a positive effect on improvement on seizure prevention at high temperatures. This indicates that merely blending various kinds of conventional powder materials does not improve seizure properties or abrasion resistance.

As for the sliding member of the present invention, by contrast, inclusion of 1 to 5% by weight of molybdenum disulfide and 2% to 5% by weight of calcium fluoride brings a prevention effect against abrasion of the counterpart which may receive a high surface pressure from the sliding member (present invention) performing relative sliding motion against the counterpart at high temperatures ranging from 400° C. to 700° C. (high pressure exerted by the sliding member during relative sliding motion does not degrade abrasion preventability against the relatively sliding counterpart). Moreover, the sliding member has outstanding corrosion resistance and oxidation resistance, even under a special fluid atmosphere. Also an elevation of the temperature of the sliding contact surface during the relative sliding motion does not cause seizure thereof. In addition, possible dispersion of the abrasion particles of molybdenum disulfide and calcium fluoride to the external environment does not bring any threat to human health.

DETAILED DESCRIPTION OF THE INVENTION

Figure 1:
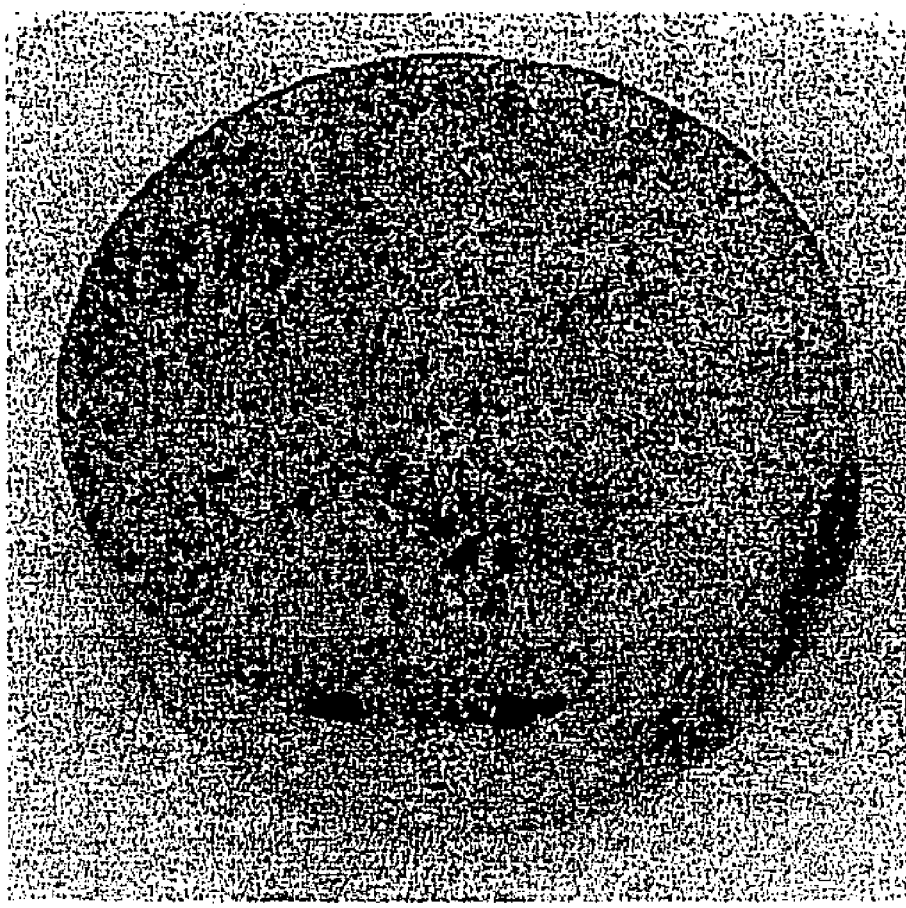
FIG. 1 is a picture, in substitute for a drawing, showing a corroded condition of the sliding surface of the sliding member as a first embodiment related to the present invention.

There will be described in detail a presently preferred embodiment of this invention.

The inventors have been making research efforts on seizure problem of the sliding surface due to friction under relative sliding motion and thereby rapidly growing abrasion of the relatively sliding counterpart, which tends to occur at high temperature. This sliding member of interest needs to be low in production cost and suited for mass-production. Therefore sintered metal products were subjected to considerations.

Among stainless steel powders used in powder metallurgy, austenitic stainless steel powder and ferrite stainless steel powder were found to be preferred materials. The austenitic stainless steel powder should preferably be 310, 304, 316 stainless or the like while the ferrite stainless steel powder should be 410, 430 stainless steel or the like. Also other kind of metal powders can be used depending on applications thereof.

The ferrite stainless steel powder shows little scale peeling under a harsh temperature change because of an excellent adhesion of the oxidation scale, thereby suitable for an environment where the temperature varies drastically. The austenitic stainless steel can maintain its strength against high temperature, thereby suitable for the applications demanding high temperature strength. It is also acknowledged that the austenitic stainless steel shows an outstanding corrosion resistance.

Even stainless steels which enjoy the above characteristics tend to suffer from a decrease in the corrosion resistance against salt due to porosities formed by sintering. In order to improve the corrosion and abrasion resistance of stainless steel, cobalt powder in an amount of 3 to 15 weight percent is added to stainless steel powder. More preferably, the cobalt powder should be in an amount of 5 to 10 weight percent. No improvement in corrosion resistance was observed with cobalt powder in an amount of less than 3 weight percent. Also cobalt in an amount of more than 15 weight percent makes the base material, stainless steel, too hard and is likely to rapidly wear the sliding surface of the relative sliding counterpart. Cobalt powder in an amount of 5 to 10 weight percent was also found to significantly enhance abrasion resistance.

The stainless steel added with cobalt alone is still capable of avoiding seizure of the sliding surface at the temperature around 200 to 400° C., but becomes liable to induce seizure of the sliding surface as well as abrasion to the relative sliding surface of the counterpart as the temperature increases. It has been found that adding molybdenum disulfide and calcium fluoride is very effective for the improvement on seizure of the sliding surface and abrasion of the sliding surface of the counterpart under a high surface pressure. Using only one of the two powder additives can bring a similar effect on the abrasion prevention of the sliding surface due to surface pressure at the temperature ranging from 200 to 400° C. However, the sliding surface of the counterpart which relatively slides against the sliding member is difficult to protect from abrasion under a high pressure and high temperature. It has turned out that adding molybdenum disulfide powder in an amount of 1 to 5 weight percent and calcium fluoride powder in an amount of 2 to 5 weight percent is very effective in this regard. As the result, abrasion prevention of the sliding surface of the relatively sliding counterpart under a high surface pressure as well as seizure prevention of the sliding surface of the sliding member at a high temperature can be achieved. Such a sliding member can enjoy outstanding corrosion and oxidation resistance at the same time. In addition, the high temperature strength of the sliding member during sliding motion can be improved. It is noted that the high temperature range to be dealt with in the sliding surface spans between 400 and 800° C., more preferably between 400 and 700° C.

Too much inclusion of molybdenum disulfide and calcium fluoride, more than 5 weight percent each say, does not help improving an abrasion prevention effect on the relatively sliding counterpart. Especially, adding calcium fluoride in an amount of more than 5 weight percent tends to cause deterioration of the sintering properties, thereby no improvement of the mechanical strength. Further, inclusion of molybdenum disulfide in an amount of less than 1 weight percent fails to exhibit seizure prevention of the sliding surface and abrasion reduction of the relatively sliding counterpart. It is also known that inclusion of calcium fluoride in an amount of less than 2 weight percent cannot secure seizure prevention of the sliding surface and abrasion reduction of the relatively sliding surface of the counterpart, either. Adding molybdenum disulfide and calcium fluoride in an equal amount which is most preferred is able to bring a multiplicative effect on the abrasion reduction of the relatively sliding counterpart as well as the seizure prevention of the sliding surface. The range described in the present invention (claim 1) can provide a similar effect on the seizure prevention under a high temperature and the abrasion protection under a high surface pressure of the relative sliding surface.

Molybdenum disulfide which enjoys a high lubrication ability gradually starts oxidizing beyond about 400° C. Resulting oxidized material (MoO3) also retains a high lubrication ability. Furthermore, even when the molybdenum disulfide surface is oxidized, the sliding surface still exhibits low friction characteristics as long as there remains non-oxidized material inside. It has been verified that a sintered sliding member made of stainless steel powder blended with molybdenum disulfide and calcium fluoride does not suffer from seizure of the relative sliding surface, not to mention up to about 400° C., but even at as high temperature as about 800° C. At the same time, abrasion protection of the counterpart which relatively slides against the sliding member is achieved. Also outstanding corrosion and oxidation resistance can be maintained over such a high temperature range.

The powder metallurgy method for this sliding member assumes stainless steel powder as the base material. And reduced powder of cobalt is blended with the stainless steel powder, which is further blended with fine powders of molybdenum disulfide and calcium fluoride. The blended powder thus formed is subjected to an additional blending process by a V-type blender for about half an hour, which is followed by a compacting mold process in which the blended powder is fed to a molding block and compacting pressure at approximately 5 ton/cm$^2$ is given to the mold by using a powder molding machine to obtain a molded work piece. The compacting pressure may vary between 4 ton/cm$^2$ and 7 ton/cm$^2$ depending on the application. Higher compacting pressure should preferably be used for high inclusion ratio of molybdenum disulfide and calcium fluoride. Less inclusion of molybdenum disulfide and calcium fluoride, on the other hand, should preferably use a low compacting pressure. For instance, the molded piece is sintered within a vacuum furnace at the sintering temperature of about 1100 to 1300° C. for about half an hour to one hour in order to obtain a sintered metal piece. Dimensional precision of the sintered metal was secured by sizing the sintered metal piece under the load pressure of 7 ton/cm$^2$. The sizing pressure should preferably be chosen between 5 ton/cm$^2$ and 8 ton/cm$^2$ depending on the applications of the sintered metal.

Embodiments

There will be described next the embodiments related to the present invention. The embodiments of the present invention are example 1 through example 6, as shown in Table 1, in which each example constitutes a sliding member (as invention) manufactured by sintering with a distinct powder blending ratio.

1) Exemplary Embodiment 1

80 weight percent of stainless steel powder (310 L stainless steel), 10 weight percent of cobalt powder, 5 weight percent of molybdenum disulfide powder and 5 weight percent of calcium fluoride powder are mixed in a V-type blender for 30 minutes. The blended powder are supplied to a molding block of a powder molding machine and press-formed at a compacting pressure of 5 ton/cm$^2$. Next, the compacted piece is sintered to a sintered metal member in a mixed atmosphere of hydrogen gas and nitrogen gas at a sintering temperature of 1150° C. for 30 minutes. In order to correct geometric distortions caused in the sintering process, a post-sintering sizing step is employed at surface pressure of 7 ton/cm$^2$ to finish into the sliding member of the exemplary embodiment 1 whose dimension is 21.1 mm in diameter and 7 mm in length.

2) Exemplary Embodiment 2

82 weight percent of stainless steel powder (310 L stainless steel), 10 weight percent of cobalt powder, 3 weight percent of molybdenum disulfide powder and 5 weight percent of calcium fluoride powder are blended and sintered in a similar manner to the exemplary embodiment 1 so as to fabricate the sliding member of the exemplary embodiment 2.

3) Exemplary Embodiment 3

83 weight percent of stainless steel powder (310 L stainless steel), 10 weight percent of cobalt powder, 2 weight percent of molybdenum disulfide powder and 5 weight percent of calcium fluoride powder are blended and sintered in a similar manner to the exemplary embodiment 1 so as to fabricate the sliding member of the exemplary embodiment 3.

4) Exemplary Embodiment 4

84 weight percent of stainless steel powder (310 L stainless steel), 10 weight percent of cobalt powder, 1 weight percent of molybdenum disulfide powder and 5 weight percent of calcium fluoride powder are blended and sintered in a similar manner to the exemplary embodiment 1 so as to fabricate the sliding member of the exemplary embodiment 4.

5) Exemplary Embodiment 5

82 weight percent of stainless steel powder (310 L stainless steel), 10 weight percent of cobalt powder, 5 weight percent of molybdenum disulfide powder and 3 weight percent of calcium fluoride powder are blended and sintered in a similar manner to the exemplary embodiment 1 so as to fabricate the sliding member of the exemplary embodiment 5.

6) Exemplary Embodiment 6

83 weight percent of stainless steel powder (310 L stainless steel), 10 weight percent of cobalt powder, 5 weight percent of molybdenum disulfide powder and 2 weight percent of calcium fluoride powder are blended and sintered in a similar manner to the exemplary embodiment 1 so as to fabricate the sliding member of the exemplary embodiment 6.

1) COMPARATIVE EXAMPLE 1

84 weight percent of stainless steel powder (310 L stainless steel), 10 weight percent of cobalt powder, 5 weight percent of molybdenum disulfide powder and 1 weight percent of calcium fluoride powder are mixed in a V-type blender for 30 minutes. The blended powder are supplied to a molding block of a powder molding machine and press-formed at a compacting pressure of 5 ton/cm$^2$. Next, the compacted piece is sintered to a sintered metal member in a mixed atmosphere of hydrogen gas and nitrogen gas at a sintering temperature of 1150° C. for 30 minutes. In order to correct geometric distortions caused in the sintering process, a post-sintering sizing step is employed at surface pressure of 7 ton/cm$^2$ to finish into the comparative example 1 whose dimension is 21.1 mm in diameter and 7 mm in length (same process, same dimension as those used for the exemplary embodiment 1).

2) COMPARATIVE EXAMPLE 2

85 weight percent of stainless steel powder (310 L stainless steel), 10 weight percent of cobalt powder, 0 weight percent of molybdenum disulfide powder and 5 weight percent of calcium fluoride powder are blended and sintered in a similar manner to the comparative example 1 so as to fabricate the comparative example 2.

3) COMPARATIVE EXAMPLE 3

85 weight percent of stainless steel powder (310 L stainless steel), 10 weight percent of cobalt powder, 5 weight percent of molybdenum disulfide powder and 0 weight percent of calcium fluoride powder are blended and sintered in a similar manner to the comparative example 1 so as to fabricate the comparative example 3.

4) COMPARATIVE EXAMPLE 4

90 weight percent of stainless steel powder (310 L stainless steel), 10 weight percent of cobalt powder, 0 weight percent of molybdenum disulfide powder and 0 weight percent of calcium fluoride powder are blended and sintered in a similar manner to the comparative example 1 so as to fabricate the comparative example 4.

5) COMPARATIVE EXAMPLE 5

85 weight percent of stainless steel powder (310 L stainless steel), 6 weight percent of carbon powder and 5 weight percent of lead monoxide (PbO) powder are blended and sintered in a similar manner to the comparative example 1 so as to fabricate the comparative example 5.

The sliding members of the exemplary embodiments 1 through 6 related to the present invention were fabricated as described above. Also the comparative examples 1 through 5 were fabricated for a comparison purpose. Table 1 shows the blending ratios of individual powder materials employed for these exemplary embodiments and comparative examples.

TABLE 1

Blending ratio of powder materials in the exemplary embodiments and comparative examples

| Embodiments . Comparisons | Co powder | MoS2 powder | CaF2 powder | lead monoxide powder | SUS310L |
|---|---|---|---|---|---|
| Embodiment 1 | 10 | 5 | 5 | 0 | rest |
| Embodiment 2 | 10 | 3 | 5 | 0 | rest |
| Embodiment 3 | 10 | 2 | 5 | 0 | rest |
| Embodiment 4 | 10 | 1 | 5 | 0 | rest |
| Embodiment 5 | 10 | 5 | 3 | 0 | rest |
| Embodiment 6 | 10 | 5 | 2 | 0 | rest |
| Comparison 1 | 10 | 5 | 1 | 0 | rest |
| Comparison 2 | 10 | 0 | 5 | 0 | rest |
| Comparison 3 | 10 | 5 | 0 | 0 | rest |
| Comparison 4 | 10 | 0 | 0 | 0 | rest |
| Comparison 5 | 0 | 0 | 0 | 5 | rest |

+ carbon powder 6

Figure 4:
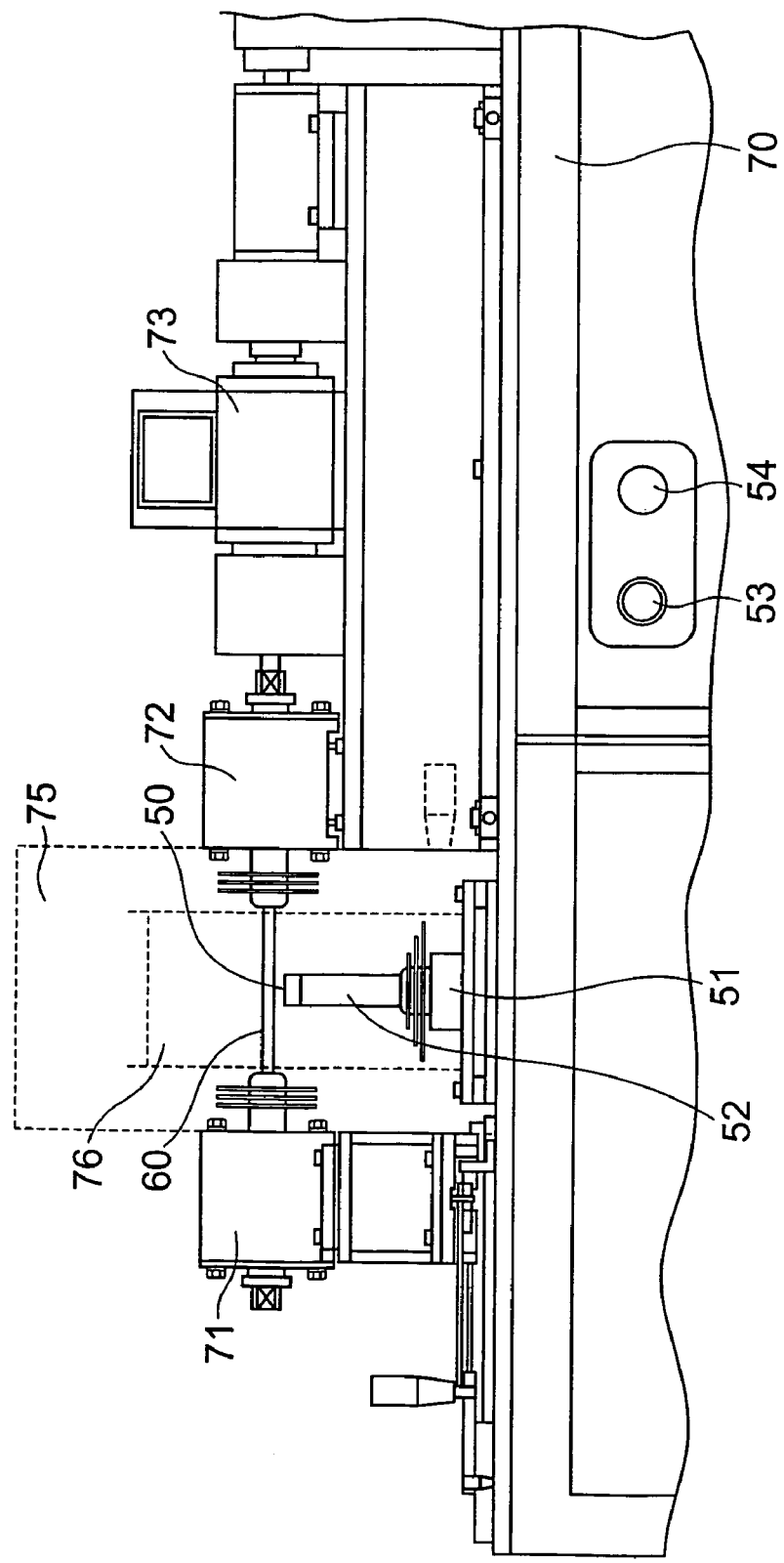
FIG. 4 is a front view of a testing machine which evaluates the sliding members as exemplary embodiments of the present invention and comparative examples.

The sliding members of the present invention and the comparative examples were tested for comparison purposes by using the testing machine shown in FIG. 4. The testing machine mounts a testing apparatus on the top of the table which constitutes a main body 70. The testing apparatus is equipped with a slidable shaft bearing 71 which is disposed on the table in a slidable manner in a direction of a stationary shaft bearing 72. The stationary shaft bearing 72 then is mounted opposite the location of the slidable shaft bearing 71. The slidable shaft bearing 71 and the stationary shaft bearing 72 jointly support a rotary shaft 60 which corresponds to the previously described counterpart, which is driven by a driving means shown to the right end portion. A sliding member of an exemplary embodiment or comparative example, as a test specimen, is fixedly mounted on the top of a loading shaft 52. The test specimen 50 is elevated by a carriage and pressed against the rotary shaft 60 at a constant loading condition. A heater cover 75 contains an ambient temperature control heater 76 therewithin which provides a stepwise control of the temperature of the test specimen 50. Shaft torque of the rotary shaft 60 is measured by a torque meter 73. 53 is an air-supply indicator and 54 is a loading control valve of the carriage 51 against the rotary shaft 60.

Figure 5:
FIG. 5 is a picture, in substitute for a drawing, showing a corroded condition of the sliding surface of the sliding member as the comparative example 4 related to the present invention.
Figure 6:
FIG. 6 is a picture, in substitute for a drawing, showing a corroded condition of the sliding surface of the sliding member as the comparative example 5 related to the present invention.

Tests conducted by using a testing machine (testing methods specified in JIS Z2371), not shown, include a rust test with salt water spraying. Testing results of the rust test are shown in FIG. 1, FIG. 5 and FIG. 6 in substitute for drawings. Results of the rust test with salt water spraying, the evaluation test of maximum seizure temperature of the sliding contact surface and the abrasion test of the counterpart (rotary shaft 60) are listed in Table 2. Also the test results on the specific abrasion quantities of the respective sliding contact surfaces are shown in Table 3.

From the above described rust test of the sliding surface with salt water spraying, the exemplary embodiment 1 and comparative examples 4 and 5 are presented in pictures as representative examples. Salt water spraying was kept for 144 hours over the test specimens 50 of the exemplary embodiment 1 and comparative examples 4 and 5. FIG. 1 is a picture, in substitute for a drawing, of the specimen surface of the exemplary embodiment 1 after the test. Also the pictures in FIG. 5 and FIG. 6 show the test results of the comparative examples wherein FIG. 5 is a picture, in substitute for a drawing, of the specimen surface of the comparative example 4 while FIG. 6 is a picture, in substitute for a drawing, of the specimen surface of the comparative example 5. As shown in FIG. 1, a little portion of red rust was observed in the exemplary embodiment 1, which virtually imposes no problem to the sliding surface. The comparative example 4 shown in FIG. 6, on the other hand, developed spotty patches of red rust here and there, which is likely to cause a trouble in a long run. The comparative example 5 shown in FIG. 6 developed red rust all over the surface and definitely shows lack of corrosion resistance. As the result, the exemplary embodiment 1 was found to be superior in corrosion resistance to the comparative examples 4 and 5.

Next, there will be described the test results of the evaluation test of maximum seizure temperature of the sliding contact surface and the abrasion test of the counterpart (rotary shaft 60) which is subjected to relative sliding motion against the sliding member.

The evaluation tests of maximum seizure temperature of the sliding members in the exemplary embodiments 1 through 6 and the comparative examples 1 through 5 were all conducted by using the previously described testing machine shown in FIG. 4. The test conditions described below were employed in which the temperature of the sliding contact surface is increased stepwise. When an abnormal vibration caused by seizure is observed, that specific temperature of the sliding contact surface was considered as a maximum seizure temperature. The test conditions are as follows.

1) Material of the rotary shaft 69: 303 stainless steel
2) Sliding velocity: 10 m/min
3) Relative surface pressure: 0.5 MPa
4) Bearing temperature: 100° C., 200° C., 300° C., 400° C., 500° C., 600° C., 700° C., 800° C.,
5) Sliding distance: 200 m for each temperature setting (because a occurrence of seizure can be judged at the initial stage.)

The test results are listed in Table 2 as maximum seizure temperature and abrasion quantity of counterpart.

The abrasion tests of the counterpart (rotary shaft 60) with respect to the exemplary embodiments 1 through 6 and the comparative examples 1 through 5 were all conducted by using the previously described testing machine shown in FIG. 4. The test conditions described below were employed in which the surface pressure acting on the sliding contact surface of the counterpart during relative sliding motion is increased stepwise and the corresponding abrasion quantities of the sliding contact surface of the counterpart are measured.

The test conditions are as follows.
1) Material of the rotary shaft 69: SUS303
2) Sliding velocity: 2 m/min
3) Relative surface pressure: 0.2 MPa at the beginning and to be increased stepwise by an interval of 0.1 MPa up to 2.2 MPa
4) Bearing temperature: 200° C.
5) Sliding distance: 200 m for each pressure setting The test results are listed in Table 2 as abrasion quantity of counterpart.

TABLE 2

Results of rust test with salt water spraying, evaluation test of maximum seizure temperature of the sliding surfaces and evaluation test of abrasion quantities of the counterparts

| Embodiments . Comparisons | A | B | C |
|---|---|---|---|
| Exemplary embodiment 1 | Good corrosion resistance | No seizure at 700° C. | $18 \times 10^{-6}$ |
| Exemplary embodiment 2 | Good corrosion resistance | No seizure at 700° C. | $43 \times 10^{-6}$ |
| Exemplary embodiment 3 | Good corrosion resistance | No seizure at 700° C. | $58 \times 10^{-6}$ |
| Exemplary embodiment 4 | Good corrosion resistance | No seizure at 700° C. | $73 \times 10^{-6}$ |
| Exemplary embodiment 5 | Good corrosion resistance | No seizure at 700° C. | $46 \times 10^{-6}$ |
| Exemplary embodiment 6 | Good corrosion resistance | No seizure at 700° C. | $65 \times 10^{-6}$ |
| Comparative example 1 | Good corrosion resistance | No seizure at 700° C. | $383 \times 10^{-6}$ |
| Comparative example 2 | Good corrosion resistance | No seizure at 700° C. | $125 \times 10^{-6}$ |
| Comparative example 3 | Good corrosion resistance | No seizure at 700° C. | $1500 \times 10^{-6}$ |
| Comparative example 4 | Poor corrosion resistance | Seizure observed at 500° C. | $1500 \times 10^{-6}$ |
| Comparative example 5 | No corrosion resistance | Unmeasurable at 600° C. | $5 \times 10^{-6}$ | where
A = Rust test with salt water spraying
B = Evaluation test of maximum seizure temperature of the sliding surfaces
C = Evaluation test of abrasion quantities of the counterparts (m)

Friction·abrasion tests of the respective sliding contact surfaces of the sliding members as the exemplary embodiment 1 and the comparative examples 4 and 5 were conducted by using the previously described testing machine shown in FIG. 4, in which the abrasion quantities were measured after giving continuous sliding motion to the sliding contact surfaces under the conditions given below. The testing conditions employed are as follows.
1) Material of the rotary shaft 69: 303 stainless steel
2) Sliding velocity: 10 m/min
3) Relative surface pressure: 0.5 MPa
4) Bearing temperature: 400° C., 500° C., 600° C., 700° C.
5) Sliding distance: 2500 m for each temperature setting The testing results are given in the column of specific abrasion quantity of Table 3.

TABLE 3

Test results of specific abrasion quantity of the sliding contact surfaces

| T (° C.) | E1($10^{-15}$ m³/Nm) | C4($10^{-15}$ m³/Nm) | C5($10^{-15}$ m³/Nm) |
|---|---|---|---|
| 400 | 3.27 | 22.58 | 46.12 |
| 500 | 2.98 | Seizure occurrence, no measurement | 40.37 |
| 600 | 1.29 | — | 50.63 |
| 700 | 0.61 | — | Oxidation, no measurement | where
T = Temperature of the sliding surface
E1 = Abrasion quantity of the exemplary embodiment 1
C4 = Abrasion quantity of the comparative example 4
C5 = Abrasion quantity of the comparative example 5

According to the above test results, it has been found that an appropriate blending ratio of molybdenum disulfide and calcium fluoride is able to improve oxidation and corrosion resistance without use of toxic substance such as lead monoxide or the like. The material thus prepared does not cause seizure of the sliding contact surface during relative sliding motion even at 700° C. of sliding surface temperature. It also can provide a support for the counterpart (rotary shaft 60) without abrasion even if the rotary shaft 60 is made of free-cutting steel such as 303 stainless steel or the like.

Exemplary Embodiment 7

Figure 2:
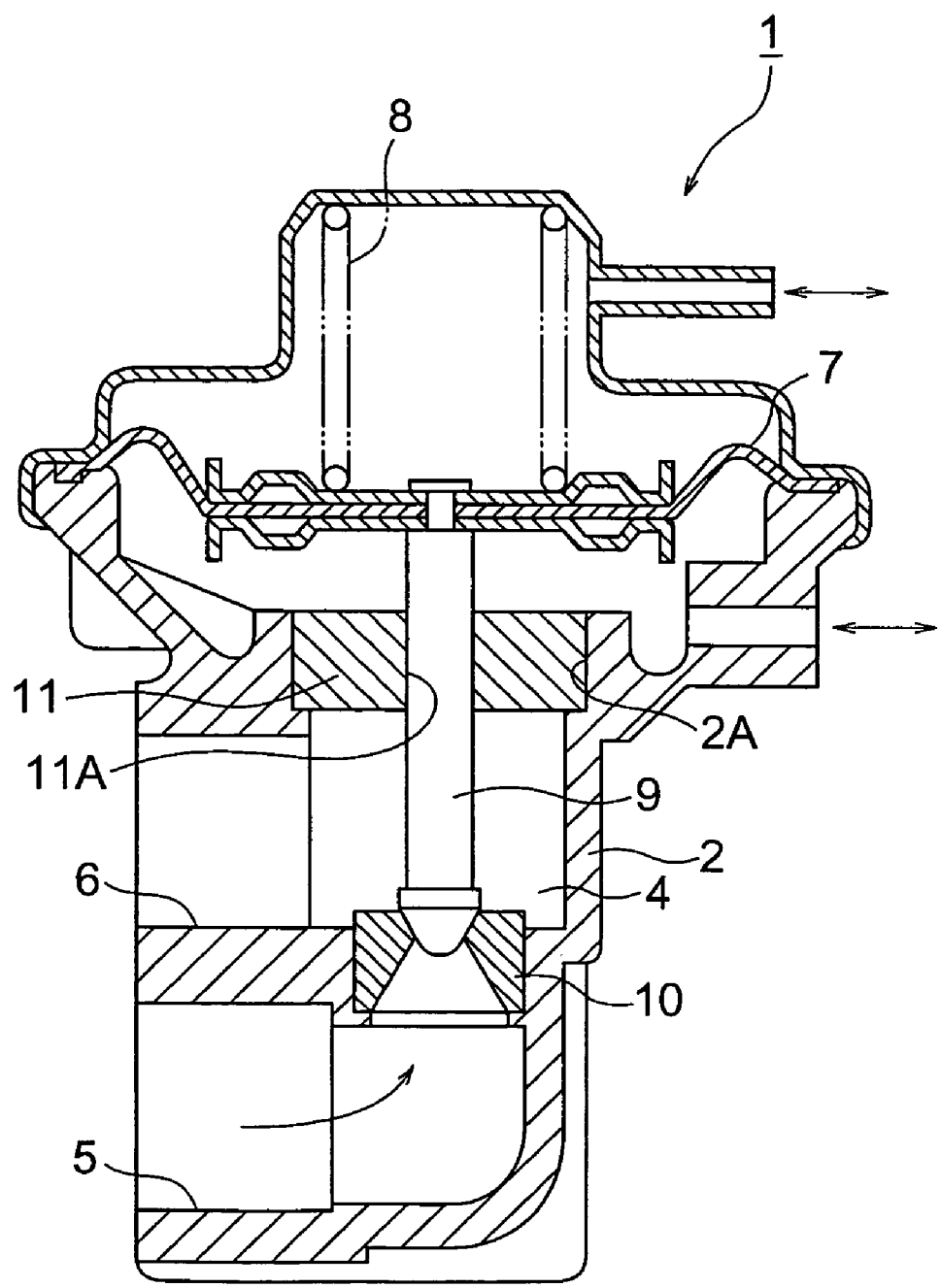
FIG. 2 is a cross-sectional view of an EGR valve which is equipped with the sliding member of the present invention.

FIG. 2 is a cross-sectional view of EGR valve 1 in an automotive engine. This illustrates an exemplary embodiment 7 in which a sliding member of the present invention is employed as a bearing 11. Housing 2 of the EGR valve 1 is made of cast iron. The bearing 11 fixedly engages an engagement face 2A disposed in the housing 2. Guide face 11A of the bearing 11 guides a needle valve 9 in freely a slidable manner. The bearing 11 corresponds to a sliding member of the present invention and is made of the same material as that used in the present invention. The housing 2 disposes a fluid passage 4 therewithin which is separated by the bearing 11. This fluid passage 4 forms a communication passage to an inlet passage 5 as well as to an outlet passage 6. A valve seat 10 is located within the fluid passage 4, engaging an engagement bore which is disposed in the housing 2. Seating of the needle valve 9 to the valve seat 10 controls the opening/closing of the passage 4 between the inlet passage 5 and the outlet passage 6. This valve seat 10 is made of the same material as that used in the sliding member of the present invention. Inside an operation chamber which is formed between the housing 2 and the upper cover of the housing 2, a diaphragm member 7 is disposed so as to separate the operation chamber from the rest. Positive or negative pressure, represented by the arrows, acting on the diaphragm member 7 causes an opening and closing movement of the needle valve 9. If there is no action from the working fluid, then the diaphragm member 7 is urged to the valve seat 10 by means of a spring 8.

This EGR valve 1 allows an exhaust gas to flow from the inlet passage 5 to the outlet passage 6 via the passage 4. Therefore, the bearing 11 and the valve seat 10 are exposed to the exhaust gas. The bearing 11 and the valve seat 10, however, can maintain durability because of excellent oxidation and corrosion resistance thereof at high temperature conditions. In addition, seizure of the needle valve 9 and the bearing 11 can also be avoided at such high temperature conditions. Making the needle valve 9 of a free-cutting stainless steel for the aim of cost reduction and rust protection thereof at high temperatures does not impose an abrasion problem thereto since the bearing 11 effectively prevents the needle valve 9 from abrasion. It has been found that the needle valve 9 sometimes has to endure a severe surface pressure at contact surface thereof with the sliding surface 11A, which is caused by the working fluid pressure and the action force of the diaphragm 7.

Exemplary Embodiment 8

Figure 3:
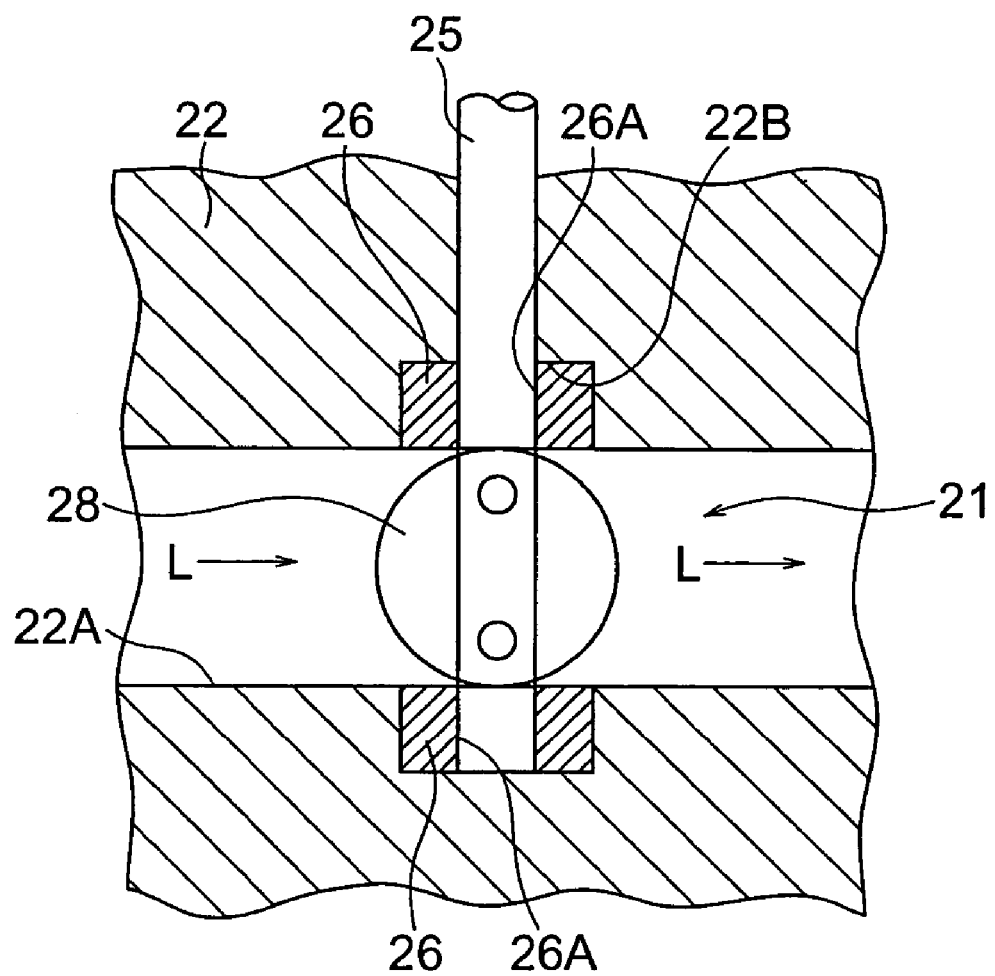
FIG. 3 is a cross-sectional view of a portion of an exhaust brake valve which is equipped with the sliding member of the present invention.

Next, FIG. 3 illustrates an exemplary embodiment 8 in which a sliding member of the present invention is employed by an exhaust brake valve 21 in an automotive engine. FIG. 3 shows a cross-sectional view of the key portion of the brake valve 21. Housing 22 disposes a fluid passage 22A therein. There also is disposed a shaft 25 extending through the passage 22A. A butterfly valve 28 is fitted with the shaft 25 in relatively a rotatable manner within the fluid passage 22A. A pair of bearings 26, 26 are fittingly inserted from a through hole, not shown, to bore sections 22B in the housing 22. These two bearings 26, 26 give a support to the shaft 25 via respective sliding contact surfaces 26A, 26A in freely a rotatable manner. The bearings 26, 26 correspond to sliding members of the present invention and are made of the same material as that used in the present invention.

The exemplary embodiment 8 allows exhaust gas to pass through the fluid passage 22A, just as in the exemplary embodiment 7. Therefore, the sliding contact surfaces 26A, 26A of the bearings 26, 26 as well as the shaft 25 are exposed to the exhaust gas. The shaft 25 and the bearings 26, 26, however, enjoy oxidation and corrosion resistance even at a high temperature, thereby exhibiting outstanding durability. Also the shaft 25 is prevented from seizure to the bearings 26, 26 at high temperature conditions. Furthermore, even when free-cutting stainless steel such as 303 stainless steel is employed for the shaft 25 under high temperature conditions in which a heavy load is given to the butterfly valve 28 due to the working fluid pressure, the high surface pressure acted on at the sliding contact surfaces of the shaft 25 and the respective bearings 26, 26 does not cause abrasion of the shaft 25.

Next there will describe preferred examples of other inventions related to the present invention.

Sliding member of a preferred embodiment as the second invention relating to the practice of the present invention employs ferritic stainless steel as a base material.

According to the sliding member related to the second invention, the ferritic stainless steel shows excellent adhesion of oxidized scale and little scale peeling even in a hot atmosphere wherein the high temperature drastically changes. Therefore it exhibits outstanding heat resistance despite oxidation under the high temperature condition. The heat resistance enjoyed by the base material allows calcium fluoride and molybdenum disulfide to be effective in view of abrasion resistance.

Sliding member of a preferred embodiment as the third invention relating to the practice of the present invention employs austenitic stainless steel as a base material.

According to the sliding member related to the third invention, the austenitic stainless steel is able to maintain its strength as a base material at elevated temperatures, so that it prevents a crack formation on the sliding contact surface despite rotary inertia forces or external vibratory forces. The sliding member also enjoys heat resistance as well as corrosion resistance. Inclusion of calcium fluoride and molybdenum disulfide adds abrasion resistance to the base material of the austenitic stainless steel.

Sliding member of a preferred embodiment as the fourth invention relating to the practice of the present invention is used for the temperature of the sliding contact surface ranging from 400° C. to 700° C.

According to the sliding member related to the fourth invention, even in case that the temperature of the sliding contact surfaces is elevated in the range of 400° C. to 700° C. or that the sliding contact surfaces relatively in contact with each other receive a severe surface pressure, inclusion of calcium fluoride and molybdenum disulfide is able to prevent abrasion of the sliding contact surfaces of the sliding member and the relatively sliding counterpart. It also brings an effect of seizure prevention of the sliding contact surface of the sliding member under a hot atmosphere wherein the high temperature drastically changes. Furthermore, the stainless steel as the base material exhibits heat resistance and a multiplicative effect of the heat resistance and inclusion of calcium fluoride and molybdenum disulfide is able to intensify the preventive effect against abrasion of the sliding contact surfaces which relatively slide against each other.

Sliding member of a preferred embodiment as the fifth invention relating to the practice of the present invention is a bearing which enjoys corrosion and oxidation resistance and supports a shaft being made of free-cutting steel.

According to the sliding member related to the fifth invention, it tolerates use of free-cutting stainless steel in a shaft member in order to prevent abrasion of the shaft due to oxidation by exhaust gas of automobiles or the like, and a severe surface pressure acting on the relatively sliding contact surfaces does not cause abrasion thereof. It further brings an effect of preventing seizure of the sliding contact surfaces at a high temperature.

As stated above, the sliding member of the present invention serves as a useful means which prevents abrasion of the counterpart even under the conditions of a high surface pressure, thereby being able to employ a cost-effective rotary shaft or the like as a relatively sliding counterpart thereof. In particular, the sliding member is considered to be useful because sliding contact surfaces thereof are free from seizure even at high temperatures and abrasion of the relatively sliding contact surfaces Having described specific embodiments of the invention, however, the descriptions of these embodiments do not cover the whole scope of the present invention nor do they limit the invention to the aspects disclosed herein, and therefore it is apparent that various changes or modifications may be made from these embodiments. The technical scope of the invention is specified by the claims.

What is claimed is:

1. A sliding member which serves as one of a pair of relatively sliding members, comprising a sintered metal essentially consisting of stainless steel as base material containing 5% to 10% by weight of cobalt, 1 to 5% by weight of molybdenum disulfide and 2% to 5% by weight of calcium fluoride, wherein said stainless steel as base material is austenitic stainless steel.

2. The sliding member as claimed in claim 1, wherein the said sliding member is usable at a temperature ranging from 400° C. to 700° C. at a sliding contact surface thereof.

3. The sliding member as claimed in claim 1, wherein said sliding member is a bearing which supports a shaft, said shaft being made of free-cutting metal and having corrosion resistance and oxidation resistance.

* * * * *